United States Patent [19]
Matte et al.

[11] Patent Number: 5,259,112
[45] Date of Patent: Nov. 9, 1993

[54] METHOD OF MAKING A CONNECTOR

[75] Inventors: Pierre Matte, Laval; Maurice Deschemaeker, Varennes-Gauzelles; Robert Colley, Le Cendre, all of France

[73] Assignee: Caoutchouc Manufacture et Plastiques, Versailles Cedex, France

[21] Appl. No.: 685,403

[22] Filed: Apr. 12, 1991

[51] Int. Cl.$^5$ .................. B21D 39/00; B23P 11/02
[52] U.S. Cl. .................. 29/890.144; 29/507; 29/523; 29/447
[58] Field of Search ........... 29/890.14, 890.144, 29/507, 523, 446, 447, 235, 237; 156/149; 264/345, 41, 42

[56] References Cited

U.S. PATENT DOCUMENTS

| | | | |
|---|---|---|---|
| 2,163,048 | 6/1939 | McKee | 29/890.144 X |
| 2,994,327 | 8/1961 | Otto et al. | 132/39 |
| 3,156,489 | 11/1964 | Deringer | 285/114 |
| 3,383,258 | 5/1968 | Houlston | 156/86 |
| 3,547,162 | 12/1970 | Schaerer | 138/125 |
| 3,548,884 | 12/1970 | Ambrose | 138/144 |
| 3,729,027 | 4/1973 | Bare | 138/109 |
| 3,858,615 | 1/1975 | Weigl | 138/121 |
| 3,972,354 | 8/1976 | Champleboux et al. | 138/103 |
| 4,013,102 | 3/1977 | DeLorean et al. | 138/144 |
| 4,087,501 | 5/1978 | Moser | 264/45.8 |
| 4,157,101 | 6/1979 | Ross | 138/130 |
| 4,159,027 | 6/1979 | Caillet | 138/127 |
| 4,242,296 | 12/1980 | Bricker | 264/149 |
| 4,249,971 | 2/1981 | Yap et al. | 156/143 |
| 4,258,755 | 3/1981 | Higbee | 138/122 |
| 4,351,366 | 9/1982 | Angioletti | 138/149 |
| 4,380,252 | 4/1983 | Gray et al. | 138/125 |
| 4,458,723 | 7/1984 | Nojiri et al. | 138/149 |
| 4,460,140 | 7/1984 | Ramazzotti et al. | 248/75 |
| 4,522,235 | 6/1985 | Kluss et al. | 183/130 |
| 4,553,568 | 11/1985 | Piccoli et al. | 138/125 |
| 4,706,711 | 11/1987 | Czvikovsky et al. | 138/103 |
| 4,773,448 | 9/1988 | Francis | 138/28 |
| 5,042,152 | 8/1991 | Sasa et al. | 29/890.144 X |

FOREIGN PATENT DOCUMENTS

| | | |
|---|---|---|
| 715296 | 10/1968 | Belgium . |
| 896329 | 9/1983 | Belgium . |
| 1012905 | 10/1974 | Canada . |
| 0032352 | 12/1980 | European Pat. Off. . |
| 0034491 | 2/1981 | European Pat. Off. . |
| 0121691 | 2/1984 | European Pat. Off. . |
| 2751323 | 11/1977 | Fed. Rep. of Germany . |
| 2929923 | 7/1979 | Fed. Rep. of Germany . |
| 3312926 | 4/1983 | Fed. Rep. of Germany . |
| 3508444 | 3/1985 | Fed. Rep. of Germany . |
| 1462731 | 1/1966 | France . |
| 2475683 | 2/1980 | France . |
| 2541420 | 2/1983 | France . |
| 53-079977 | 7/1978 | Japan . |
| 55-097948 | 7/1980 | Japan . |
| 57-120427 | 7/1982 | Japan . |
| 59-147184 | 8/1984 | Japan . |
| 59-169835 | 9/1984 | Japan . |
| 61-041522 | 2/1986 | Japan . |
| 61-153088 | 7/1986 | Japan . |
| 61-206632 | 9/1986 | Japan . |
| 61-206633 | 9/1986 | Japan . |
| 6709089 | 12/1968 | Netherlands . |
| 8101702 | 6/1981 | PCT Int'l Appl. . |
| 8302989 | 9/1983 | PCT Int'l Appl. . |
| 573666 | 7/1976 | U.S.S.R. . |
| 1379544 | 2/1971 | United Kingdom . |
| 2076926 | 5/1981 | United Kingdom . |

OTHER PUBLICATIONS

McGraw-Hill Concise Encyclopedia of Science & Technology Second Edition p. 1469.

*Primary Examiner*—Timothy V. Eley
*Attorney, Agent, or Firm*—Thomas N. Ljungman

[57] ABSTRACT

A connector for connecting pipes having an inner portion and an outer portion surrounding at least a part of the inner portion. The outer portion having areas of reduced diameter therein to form a housing or groove in the outer portion for a clamp.

8 Claims, 8 Drawing Sheets

FIG_3a

FIG_3b

FIG_3c

FIG_3d

FIG_3e

FIG_3f

FIG_5a

FIG_5b

FIG_6

METHOD OF MAKING A CONNECTOR

BACKGROUND OF THE INVENTION

1. Field of the Invention

This invention relates to a tubular connector for transfer of fluids or circulation of fluids in industrial or automotive applications.

2. Description of the Prior Art

As is well known in the field of making tubing, tubing is essentially easiest to make in straight elongated form, such as by extrusion. Such straight tubing, when made in large rolls can then be cut to various sizes for use in a variety of applications. One such application might be in automobiles, or trucks, etc., for the connection of the engine to the radiator so that the hot fluid produced within the engine can be transferred to a radiator where the fluid is then cooled and circulated back into the engine where the cooled fluid is again heated by the combustion heat produced by the engine. Thus, a variety of automobiles, or trucks, etc., in which the engine is spaced a different distance from the radiator, or in which the inlet and outlet pipes from the engine and radiator are offset in a variety of directions and positions, may be able to use the same type of tubing from the same original tubing supply roll, by simply cutting the tubing to different lengths and elastically bending the tubing as needed to accommodate the various arrangements of engines and radiators.

These connector tubes are primarily fastened to the inlet and outlet pipes by some sort of clamping device which fits over an end of the connector tube, and which presses the connector tube into tight engagement with the pipe. Such a clamping device is usually provided in addition to the connector, and is slid into place over the connector before the connector is applied to the pipe. Applying a clamping device in such a manner, however, can pose several disadvantages, firstly, the clamp would need to be held into place during preliminary tightening, thus requiring the user to use both hands to fasten the connector into place, and secondly, the position of the clamp on the connector may not always be in the most desirable location along the connector, which could thus lead to leakage if not correctly positioned.

There is also essentially one problem which arises in making straight tubing and then adapting it to a variety of uses, especially if the use requires that the tubing be sharply bent. In so bending the tubing, a phenomenon called kinking often occurs, which phenomenon is well known to both the producers and the users of the tubing. Kinking describes the ovalisation and subsequent local pinching of the tubing as the tubing is bent, so that if the tubing is bent to have a small radius of curvature, complete blockage of the interior passage of the tubing is possible. This pinching usually occurs when a tube is bent beyond an acceptable limit. Such pinching can also be described as a folding of the tube wall which is located to the inside of the bent tubing.

In the remainder of the present description, kinking will be used to designate the phenomenon described above.

The prior art includes three types of solutions to the problem of kinking.

The first solution comprises the fabrication of bent tubes, in which various processes are used to give the tubes the shape they must have for their intended application. Curved tubes, or elbows, of this type are described in Japanese Patent 61,206,633, which has Yokahama Rubber as patentee, where the result is achieved by casting with a process using lead, according to an old technique which is well known in the rubber transformation industry; in International Patent WO 8302989, which has Norskhydro as patentee, in which the shaping is performed on a press; in U.S. Pat. No. 4,242,296, which has Dayco as patentee; or Japanese patents 57,120,427, which has Tokai Rubber as patentee, or 61,206,632, which has Yokahama Rubber as patentee, in which the shape is imparted by vulcanization on a mandrel having the desired geometry; or 59,169,835, which has Kurashiki Kako as patentee, where the tube is cast in a mold after having been covered with inorganic powder; or 53,079,977, which has Bridgestone Tire as patentee, where the shape is obtained by molding with an inflatable mandrel; or 61,041,522, which has Tiger Polymer as patentee, where the curved tube is realized by blow-moulding.

These techniques for the fabrication of bent tubes make it possible to produce tubes with the geometry desired for the application, but whose shapes and sizes are rather strictly limited, and do not offer any protection against kinking if, as the result of improper workmanship, or by accident, the tube is bent along a radius which is smaller than intended. Moreover, the realization techniques are frequently complex and require the use of heavy equipment, such as presses, blow-moulding installations, lead presses and material to strip off the lead coating.

The second solution to the problems of kinking comprises the realization of straight tubes which will accept small radii of curvature. The methods most often used include:

- The reinforcement of the wall by use of a rubber-based mixture with a high modulus of elasticity, with the possible incorporation of short fibers, such as the realizations described in U.S. Pat. No. 4,522,235 and European Patent 32352 (Goodyear tire and Rubber), or European Patent Application 74747 (Parker Hannifin);
- an excellent adherence between the constituent elements of the wall of the tube—which may or may not include reinforcement elements—as described in Japanese Patents 61,153,088 (Nitta Mua), 59,147,184 (Toyo Rubber) and 55,097,948 (Meij Rubber), in Dutch Patents 7,506,969 (Polymer) and 6,709,089 (Angus), or in U.S. Pat. No. 8,383,258 (Alfred Roberts & Son);
- the reinforcement of the wall by one or more textile and/or metal reinforcement elements, which are described in a large number of publications, such as German Patents 3,508,444 (Holterus) or 2,751,323 (Bindl), U.S. Pat. Nos. 4,553,568 (Goodyear Tire and Rubber) or 4,460,140 (Nordson), French Patents 2,541,420 (Caoutchouc Manufacture et Plastiques) or 2,475,683 (Bodinier), British Patents 2,076,926 (Bridgestone Tire) or 1,379,544 (Moss), European Patent 121,691 (Grohe) and Austrian Patent 6,449,822 (George Angus);
- an additional reinforcement by the addition of ribs or grooves, as described in U.S. Pat. No. 4,258,755 (Bandag), Canadian Patent 1,012,905 (Dayco), or Belgian Patent 715,296 (Tubigomma);
- an element which allows irreversible curvature after fabrication, such as a deformable ring, as proposed by the European Patent 34491 (Gates Rubber);

maintenance of the circular cross section by the addition of rigid rings, as described in German Patent 3,312,926 (Aerocontact), U.S. Pat. No. 4,157,101 (Goodyear Tire and Rubber), or 3,858,615 (Puritan Bennett), or the use of U-shaped elements, as described in Belgian Patent 896,329 (Dillon).

The third method used to prevent kinking is the addition of mechanical means integrated into the tube, or external mechanical means which prevent curvature beyond acceptable limits. Such means are described in French Patent 1,462,731 (BTR Industries) and Russian Patent 573,666 (Fomin).

Whatever the method considered, the solutions proposed have the disadvantage that they increase the weight of the tube (as a result of the reinforcements, i.e., the rings), reduce the flexibility (by increasing the bonding between constituents or by incorporating reinforcement elements) and complicate the fabrication process. A simpler solution is proposed in German Patent 2,929,923 (Metronic Electronic), which solution uses a polyurethane foam tube for an air bubble massage installation.

The proposed polyurethane tube, however, would not be suitable for the transport of fluids, on account of cavitation phenomena which occur when fluids come in contact with the structure containing the polyurethane cells.

Moreover, the material selected, polyurethane, is sensitive to hydrolysis and attack by various chemical media, and could not be used for the transport of steam or corrosive products. Finally, to constitute a tube by itself, it would require the installation of an internal or external coating, which would allow it to withstand the internal pressure strains and abrasion, common in fluid handling operations.

OBJECT OF THE INVENTION

The object of the invention is, therefore, to eliminate these disadvantages by developing a connector which is simple to manufacture, and therefore economical, and which does not require the use of expensive or complicated equipment.

SUMMARY OF THE INVENTION

The connector which is the object of the invention is characterized by the fact that it comprises at least the following elements, from the interior to the exterior: an internal tubular portion; and an external tubular portion which can have a "built-in" clamp housing formed during the manufacture of the tubing.

The internal tubular portion can be made of an elastomer compound which is resistant to the fluid to be transported, and the external tubular portion can be made from an elastomer compound which expands upon heat treatment, thereby possibly forming the housing during manufacturing of the tube by restricting a portion of the elastomer from expanding. This external elastomer can be adapted to the utilization conditions and may also be capable of forming a quasi-solid external skin, with an essentially smooth appearance. And, the external portion can cover all or part of the connector depending on the need.

The connector also frequently comprises an elastomer for the second layer, in which elastomer, voids or cells form during the heat treatment. Also, there can be at least one reinforcement element interposed between the internal tube and the cellularized external coating. This reinforcement element can essentially comprise fabrics, wires or cables, made from textile or metal, and possibly a thin layer of a compact elastomer compound inserted between the reinforcement material and the cellularizable elastomer compound.

Under certain conditions of utilization in a severe environment, i.e., an environment which is particularly abrasive or corrosive, it is also possible to equip the flexible connecting tube with a protective coating at the periphery of the cellularized zone, which coating then partly constitutes the wall. The protective coating, depending on the individual requirements, may or may not be separated from the cellularized wall by the interposition an element, most frequently textile, which distributes stresses, and is called the "breaker" or "external liner".

The process for the fabrication of the flexible connecting tube is characterized by the fact that the cellularizable elastomer compound, which constitutes all or part of the thickness and/or the length of the flexible tube, is in a compact form at the time of the fabrication of the flexible connecting tube and is expanded to form a layer of cellular material at the time of the thermal treatment designed to vulcanize the elastomer components. This expansion can be total or limited by appropriate means such as molds placed locally in the zones where expansion is to be controlled.

One aspect of the invention resides broadly in a connector for connecting at least a first pipe segment to a second pipe segment, the connector comprising at least a first tubular element and a second tubular element, the second tubular element being disposed about at least a portion of the first tubular element, the second tubular element having at least a first portion, a second portion, and a third portion disposed adjacent and between the first portion and the second portion. The first portion has a first diameter, the second portion has a second diameter, and the third portion has a third diameter such that the first diameter of the first portion and the second diameter of the second portion are greater than the third diameter of the third portion disposed adjacent and between the first portion and second portion, the third portion comprising a housing within the second tubular element, and clamping apparatus disposed within housing for retaining the connector on at least one of: the first pipe segment and the second pipe segment.

Another aspect of the invention resides broadly in a method of making a connector for connecting pipes, the connector comprising at least a first tubular element and a second tubular element, the second tubular element being disposed about at least a portion of the first tubular element, the second tubular element having at least a first portion, a second portion, and a third portion disposed adjacent and between the first portion and the second portion, the first portion having a first diameter, the second portion having a second diameter, and the third portion having a third diameter such that the first diameter and the second diameter are greater than the third diameter, the third portion comprising a housing within the second tubular element, and the housing comprising a clamp disposed within the housing for retaining the connector on at least one of: the first pipe segment and the second pipe segment, the method comprising the steps of: disposing the second tubular element over at least a portion of the first tubular element; disposing at least one clamping apparatus about said second tubular element upon the third portion of the second tubular element so that the second tubular element is disposed under the at least one clamping apparatus; and thermally treating the second tubular element to expand the second tubular element in the first and the second portions of the second tubular element to thereby form the housing in the second tubular element.

An additional aspect of the invention resides broadly in a method for using a connector for connecting at least a first and a second pipe segment, the connector comprising at least a first tubular element and a second tubular element, the second tubular element being disposed about at least a portion of the first tubular element, the second tubular element having at least a first portion, a second portion, and a third portion disposed adjacent and between the first portion and the second portion. The first portion has a first diameter, the second portion has a second diameter, and the third portion has a third diameter such that the first diameter and the second diameter are greater than the third diameter, the third portion comprising a housing within the second tubular element, and the housing comprising clamping apparatus disposed within the housing for retaining the connector on at least one of: the first pipe segment and the second pipe segment. The tubing is made by a process comprising the steps of: disposing the second tubular element over at least a portion of the first tubular element; disposing at least one clamping apparatus about an end of the second tubular element upon the third portion of the second tubular element so that the second tubular element is disposed under the at least one clamping apparatus; and thermally treating the second tubular element to expand the second tubular element in the first and second portions of the second tubular element to thereby form the housing in the second tubular element. The method for using the connector comprising the steps of: inserting the pipe segment into the end of the connector by moving at least one of the connector and the pipe segment relative to the other of the connector and the pipe segment; tightening the end of the connector to the pipe segment with the at least one clamping element disposed within the housing; bending the connector to at least partially compress the second tubular element; and distributing stresses through the connector to reduce kinking of the connector.

BRIEF DESCRIPTION OF THE DRAWINGS

The characteristics and variants of the invention are explained in greater detail below, with reference to the accompanying figures, in which.

DESCRIPTION OF THE PREFERRED EMBODIMENTS

Figure 1A:
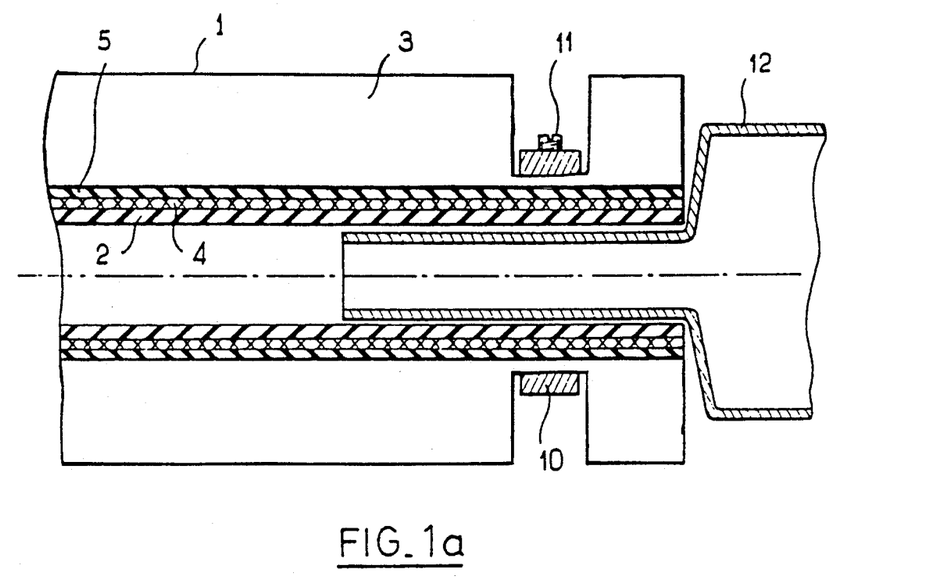
FIGS. 1a and 1b illustrate two variants of the connector with a clamping ring integrated in the wall.
Figure 1B:
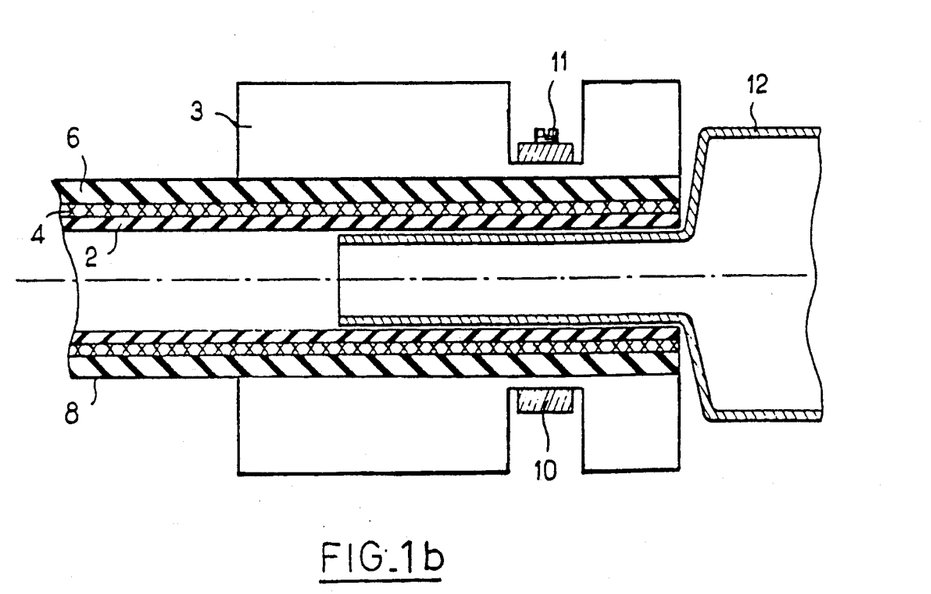

FIGS. 1a and 1b illustrate two embodiments of a connector according to the invention, the connector having a clamping ring integrated into the wall of the connector.

FIG. 1a shows, in cross section, how the connector tube 1, comprised of the internal tube 2, the reinforcement element 4, the thin layer 5 and the thicker outer layer 3 can be equipped, during fabrication, with a clamping ring 10, generally made of metal, which may have a screw 11 as shown, or another fastening means, allowing a leakproof installation of the connector 1 on a rigid terminal 12, which connects it to a motor or other type of mechanism. For effective clamping, the material under the clamp is preferably predominately made of a compact solid material.

The technique, used to equip the connector 1 with the clamping ring 10, consists of installing the clamping ring onto the connector before the final heat treatment of the connector. Thus, as the tubing undergoes the heat treatment, the outer layer expands only in areas on each side of the clamp thereby forming the clamp housing.

Consequently, the clamp cannot fall out during the installation of the flexible tube, as can frequently occur in the case of conventional tubes when the clamp freely slides along the end. This technique also makes it possible to achieve the correct positioning of the clamp 10 on the terminal portion of a pipe, to prevent clamping over a knobbed portion of the pipe, which could cause a leak.

It is also possible to form such a connector which has the thick outer layer 3 disposed only on the end portions of a conventional connector, as shown in FIG. 1b. Such an installation keeps the end of the connector from kinking adjacent the end of the terminal portion of a pipe 12. It is sufficient to equip the terminal zone of the otherwise conventional tube 8, here comprising an internal tube 2 and an external covering 6, both made of a compact elastomer compound and separated by a reinforcement element 4, with a localized coating of the thick outer layer 3, which coating is prevented from expanding, as described above, in the zone intended to hold the collar, or clamp, 10 for tightening over the connection terminal 12.

FIGS. 2a-2f show, by way of example and in no way intended to limit the invention, several possible constructions of the connector, according to various embodiments of the invention.

Figure 2A:
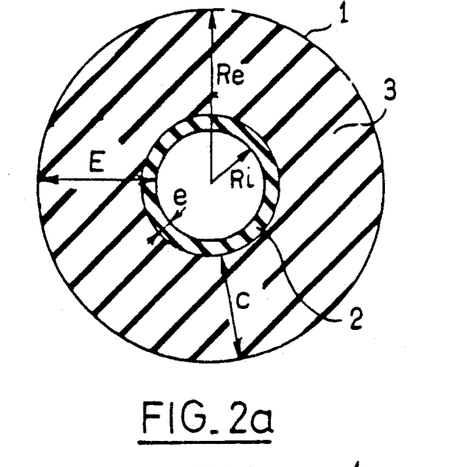
FIGS. 2a-2f illustrate several possibilities for the construction of the flexible tube.

FIG. 2a shows in cross section the simplest design, in which the flexible tube 1 comprises only two elements, i.e. from the inside to the outside, an internal tube 2, made of a solid, elastomer compound with thickness e, and a layer 3 made of an elastomer compound with thickness c. In the most common configurations, the thickness e of the compact elastomer compound layer of the internal tube 2 is low in relation to the total thickness ($E = R_{outside} - R_{inside}$), $R_{outside}$ being the outside radius of the cross section and $R_{inside}$ being the inside radius of the cross section of flexible tube. The resistance to kinking is directly influenced by the thickness c of the layer 3.

Most generally, the ratio of the thickness e of the compact elastomer compound layer which constitutes the internal tube 2 to the thickness c of the outer layer 3 is between 0.09 and 1.

Nevertheless, there are cases in which the ratio of the thickness e of the compact elastomer compound layer 2 to the total thickness E of the wall can reach, or even exceed 0.80, with the connector nevertheless exhibiting improved characteristics from the point of view of resistance to kinking.

Figure 2B:
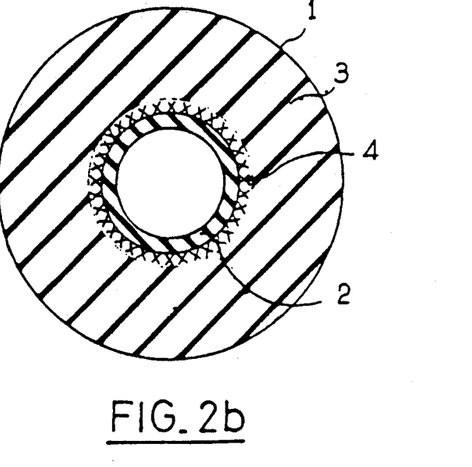

FIG. 2b shows another configuration of the connector 1, in which a reinforcement layer 4, comprising fabric, wires or cables, made from textile or metal, has been inserted between the internal tube 2 and the layer 3, which reinforcement layer 4 gives "body" to the flexible tube 1.

Figure 2C:
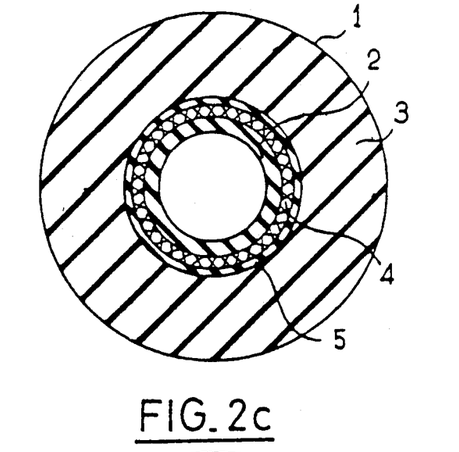
Figure 2D:
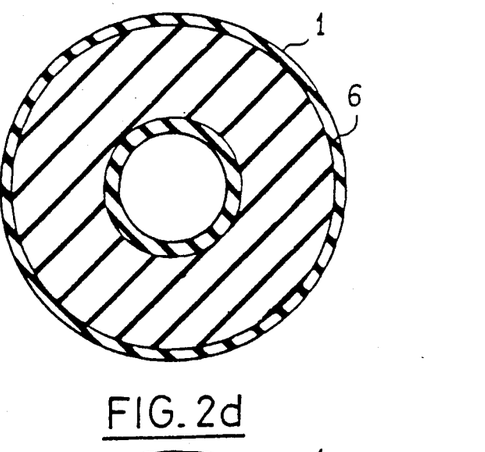
Figure 2E:
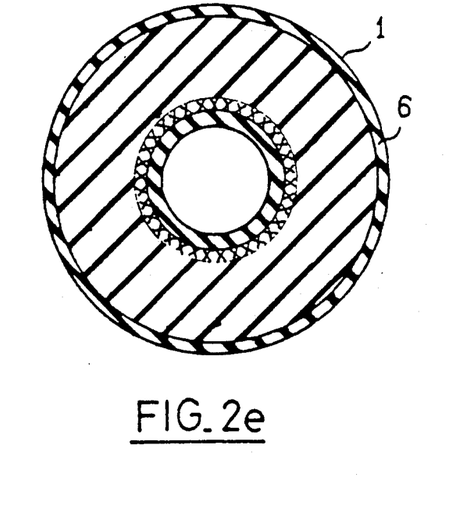

FIG. 2c shows a variant of the connector 1, in which an additional thin layer 5 of compact elastomer compound is added between the reinforcement element 4, applied externally to the internal tube 2 also made of compact elastomer compound, and the layer 3, to create a gradient of moduli from the high modulus of the reinforcement element 4 to the low apparent modulus of the layer 3, the purpose of which is to provide a better distribution of stresses and to increase the bonding between the elements of the flexible tube.

In FIGS. 2a, 2b and 2c, the layer 3 comprises, on its outer periphery, an integrated skin, produced during fabrication, which has an essentially smooth appearance and comprises the coating of the flexible tube 1.

For applications in a severe environment, e.g. an environment which is particularly abrasive or corrosive, the flexible tube 1 can also be given, on top of the elements described above, a coating 6 of a compact elastomer compound, with a formulation adapted to the requirements of usage. Such a coating 6 is shown in the embodiments illustrated in FIGS. 2d and 2e, for example, which Figures essentially correspond respectively to FIGS. 2a and 2b.

Figure 2F:
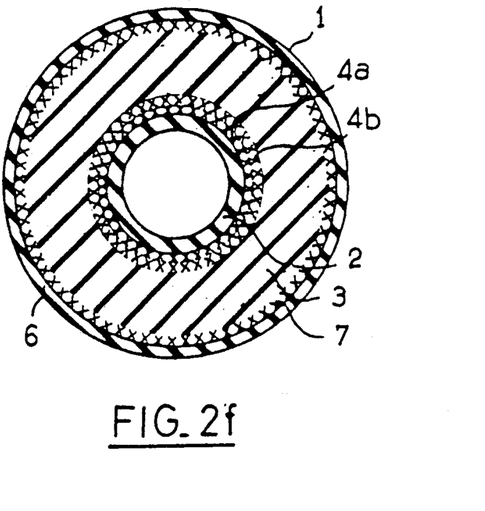

FIG. 2f is a schematic illustration of the construction of a flexible tube 1, in which two reinforcement elements, comprising a fabric made up of wires or cables, which may be either textile or metal, 4a and 4b, are interposed between the internal tube 2 and the layer 3, over which is placed a breaker element 7, made of wires or cables which are made of textile or metal. The breaker 7, itself, can be covered by an external coating 6, designed to protect the flexible tube 1 if it is to be used in a hostile environment.

FIGS. 3a-3f illustrate several embodiments of the flexible tube 1.

Figure 3A:
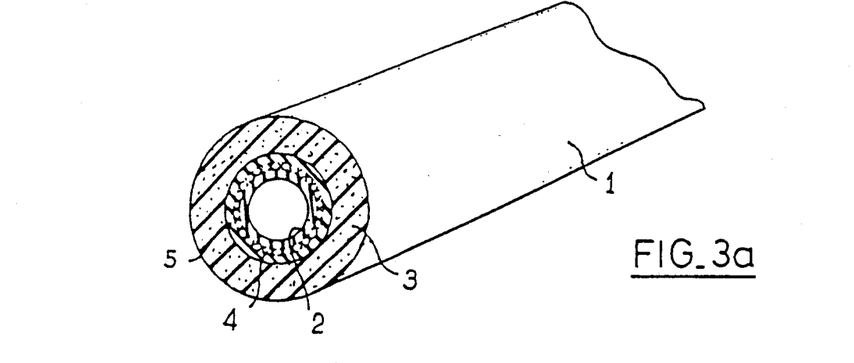
FIGS. 3a-3f illustrate several realizations of the flexible tube which is the object of the invention.

It is obviously possible, and simple, to achieve an embodiment of the invention, such as illustrated in FIG. 3a, which will be in the form of the flexible tube 1, which is straight like a conventional tube, but where its structure will allow it to accept small radii of curvature in use. Such a flexible tube comprises, from the inside to the outside, an internal tube 2 of compact elastomer compound, a reinforcement element 4, which is made of wires or cables which are made of textile or metal, and the layer 3, made of cellularized elastomer compound with an integrated skin. Such a cellularized material essentially comprises air pockets or voids disposed therein.

Figure 3B:
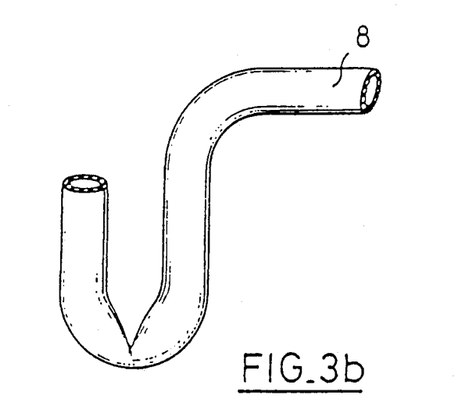
Figure 3C:
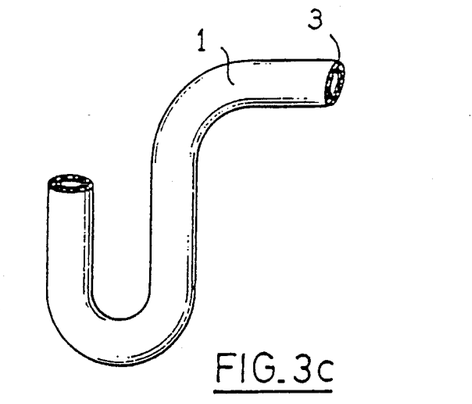

FIGS. 3b and 3c illustrate the differences in behavior of a conventional curved tube 8, made of only compact elastomer. The conventional tube, as shown in FIG. 3b, kinks when accidentially curved beyond the specified limits, while the flexible tube 1, according to the invention, comprising a cellularized elastomer compound layer 3, accepts the same small radius of curvature without bending the wall, as shown in FIG. 3c.

Figure 3D:
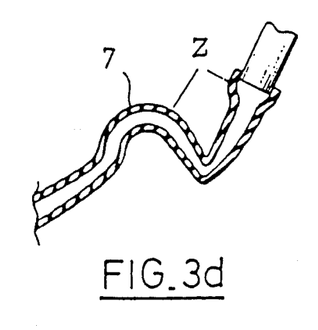

FIG. 3d illustrates the curvature of a conventional tube 8 of the type used as flexible hose connections in automotive vehicles. Such a tube is generally cast in its final shape, using one of the techniques conventionally used in the rubber transformation industry, and described in the analysis of the prior art. Such a tube cannot accept such a small radius of curvature as that represented in zone Z without kinking.

Figures 3E, 3F:
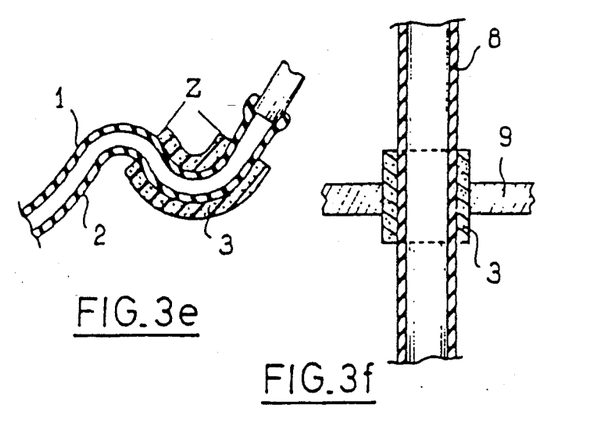

FIG. 3e shows how the flexible connector 1, which is the object of the invention, solves this problem. It is only necessary to locally cover the body of the tube, in a localized zone Z, with the layer 3 comprising the cellularized elastomer compound. This technique, which uses the cellularized elastomer compound 3 over only part of the length of the flexible tube, has the advantage of eliminating kinking in the zones Z which have a small radius of curvature. This is accomplished without increasing the thickness of the less stressed areas of the tube, an advantage frequently useful to meet space requirements.

FIG. 3f shows a tube 8, protected against kinking in the vicinity of a rigid wall through which it must pass, e.g. a metal plate, by adding, on top of the external coating, in the zone of contact with said wall, a localized layer of a cellularized elastomer compound 3, which has the additional advantage of protecting the flexible tube against the damage which could be caused to it by the rigid or sharp edges of the wall.

Figure 4A:
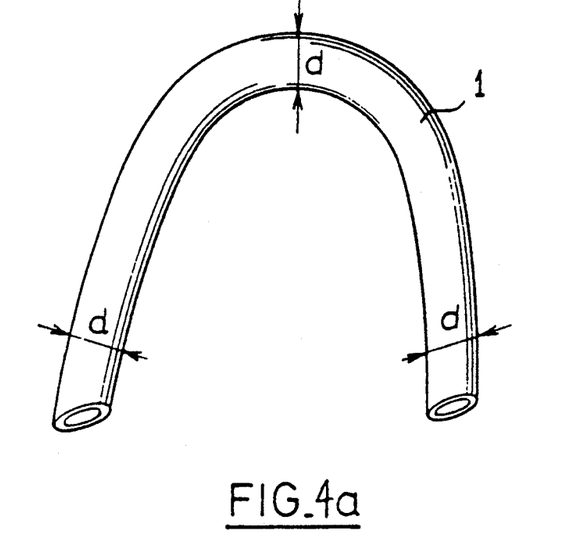
FIGS. 4a and 4b illustrate the phenomenon of kinking.
Figure 4B:
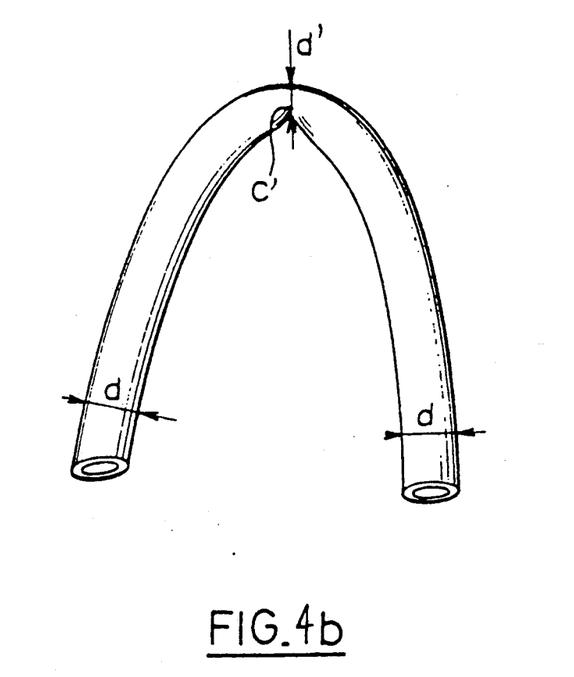

FIGS. 4a and 4b also illustrate the phenomenon of kinking. FIG. 4a shows a tube 1 with an outside diameter d curved within acceptable limits, i.e. without the occurrence of kinking. FIG. 4b shows the same tube 1 curved to an unacceptable radius, which causes ovalisation and a break in the internal zone of the wall at point c' and the reduction of the cross section, with the diameter d changing to a very much lower value d'; the kink can even cause complete obstruction of the passage. When the tube is subjected to high internal pressure, the risks of kinking are reduced, but when the tube operates with a pressure below ambient pressure or underpressure, the phenomenon can occur quite frequently, and for relatively large radii of curvature.

Figure 5A:
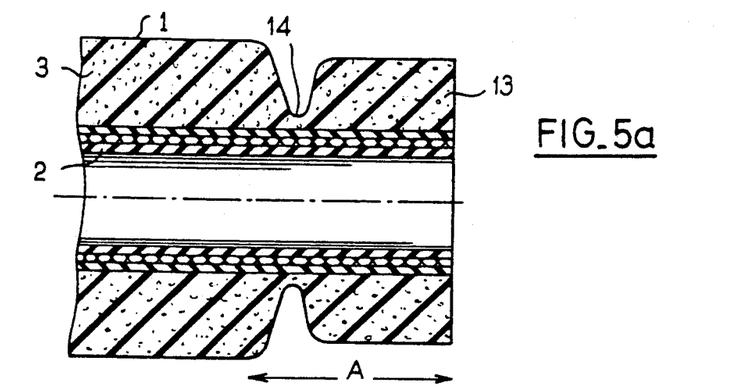
FIGS. 5a and 5b illustrate two variants of the flexible tube having grooves in the outer layer.
Figure 5B:
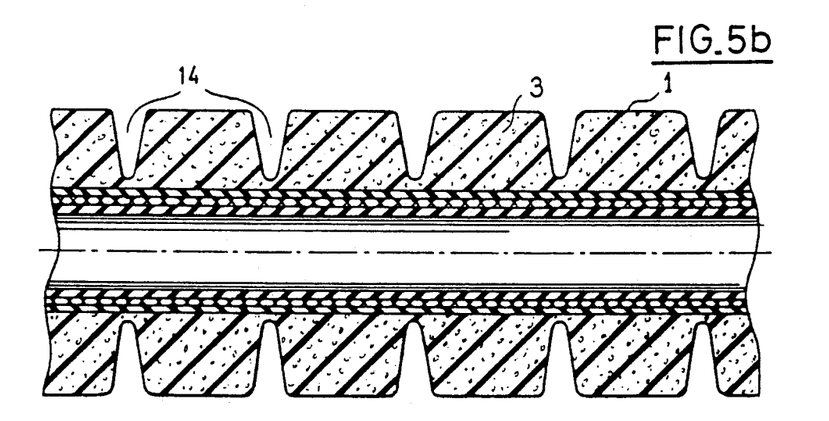

FIGS. 5a and 5b show two variants of the flexible tube, using the same realization principle.

In FIG. 5a, the end A of the flexible tube 1 comprises a shoulder 13, separated from the rest of the body of the tube by a groove 14.

The embodiment illustrated in FIG. 5a comprises a single groove 14, moreover, several grooves with similar or different shapes, can be realized by the same process, e.g. to serve as reference points or markings.

The principle is the same, in part, as that described for the realization of the variants in FIG. 1, since it makes it possible to control the expansion of the cellularizable elastomer compound constituting the layer 3 placed on top of the internal tube 2 made of a compact elastomer compound, by casting the end A in a mold whose imprint has the desired shape. Therefore, by substantially preventing cellularization, the groove 14 is formed, and by limiting expansion, the shoulder 13 is formed.

It is likewise possible to realize markings or to obtain special shapes of the end A of the flexible tube 1.

FIG. 5b illustrates the application of the same principle to the realization of multiple grooves 14, spaced along the body of the flexible tube 1. For example, it is possible to have, here and there, suspension devices for suspension at multiple points, if the tube is to be laid across a shop, a construction site or a long distance. At the same time it allows the tube to retain a certain flexibility, without causing kinking of the tube wall at the suspension points.

Figure 6:
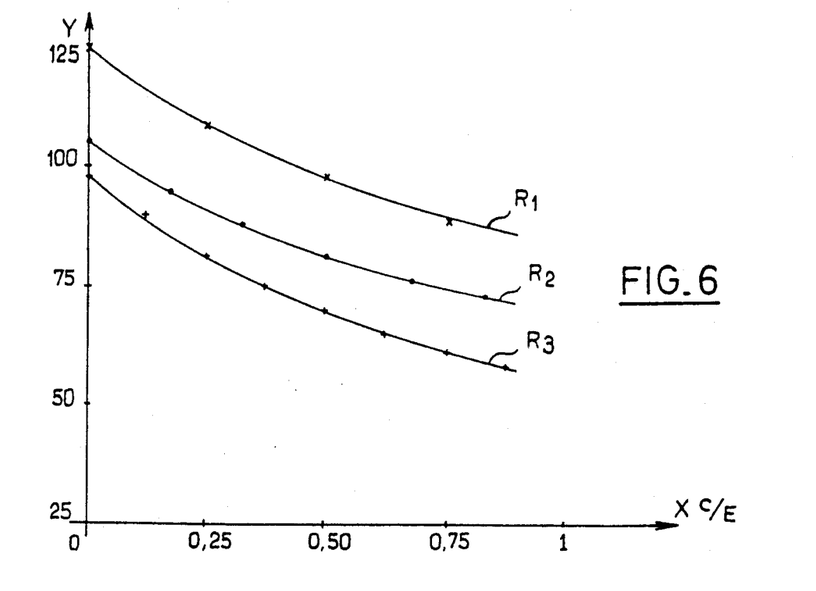
FIG. 6 is a graph of the evolution of the radius of curvature as a function of the thickness of the outer wall of the connector made according to the invention.

Such a device would be very valuable, for example, for the fluid lines of any moving equipment, such as a travelling crane. FIG. 6 is a graph which illustrates the evolution of the limit radius of curvature R before kinking of flexible tubes having different total wall thicknesses E.

The abscissa axis OX represents the ratio of the thickness c of the cellularized elastomer compound layer to the total thickness E of the wall, for a flexible tube comprising said cellularized layer over its entire length.

The ordinate axis OY represents the limit radius of curvature R in millimeters.

Curves R1, R2 and R3 correspond respectively to the limit radii of curvature of Examples 1, 2 and 3, described in the following tables, where e is the thickness of the compact elastomer compound layer comprising the internal tube.

The measurements were made on flexible tubes with an inside diameter of 16 mm.

The gain achieved in terms of the radius of curvature, indicated in the last column of the tables, is the ratio, expressed in per cent, of the radius of curvature of each of the realizations of an example, to the radius of curvature R of the tube. These examples, that is, 1a of Example 1, 2a of Example 2, and 3a of Example 3, which do not have a cellularized elastomeric layer are used as initial reference tubes. The improvements in bending without kinking, which is this gain, consequently, can be used as a reference number to indicate the improved performance of the present invention.

| Example 1 Realization | E mm | c mm | e mm | c/E | R1 mm | Gain % |
|---|---|---|---|---|---|---|
| 1a Reference | 4 | 0 | 4 | 0 | 125 | — |
| 1b | 4 | 1 | 3 | 0.250 | 109 | 14.7 |
| 1c | 4 | 2 | 2 | 0.500 | 98 | 27.5 |
| 1d | 4 | 3 | 1 | 0.750 | 88 | 42.0 |

| Example 2 Realization | E mm | c mm | e mm | c/E | R2 mm | Gain % |
|---|---|---|---|---|---|---|
| 2a Reference | 6 | 0 | 6 | 0 | 105 | — |
| 2b | 6 | 1 | 5 | 0.167 | 95 | 10.5 |
| 2c | 6 | 2 | 4 | 0.333 | 88 | 19.3 |
| 2d | 6 | 3 | 3 | 0.500 | 82 | 28.0 |
| 2e | 6 | 4 | 2 | 0.667 | 76 | 38.2 |
| 2f | 6 | 5 | 1 | 0.833 | 72 | 45.8 |

| Example 3 Realization | E mm | c mm | e mm | c/E | R3 mm | Gain % |
|---|---|---|---|---|---|---|
| 3a Reference | 8 | 0 | 8 | 0 | 98 | — |
| 3b | 8 | 1 | 7 | 0.125 | 90 | 8.9 |
| 3c | 8 | 2 | 6 | 0.250 | 82 | 19.5 |
| 3d | 8 | 3 | 5 | 0.375 | 75 | 30.7 |
| 3e | 8 | 4 | 4 | 0.500 | 70 | 40.0 |
| 3f | 8 | 5 | 3 | 0.625 | 65 | 50.8 |
| 3g | 8 | 6 | 2 | 0.750 | 62 | 58.1 |
| 3h | 8 | 7 | 1 | 0.870 | 58 | 69.0 |

The comparison of the limit radii of curvature R of the examples not comprising a cellularized elastomer compound layer 1a, 2a, and 3a, confirms an observation of the prior art: an increase in the compact elastomer wall thickness of the flexible tube reduces the limit radius of curvature, since the corresponding values are respectively 125 mm, 105 mm and 98 mm, for thicknesses of 4 mm, 6 mm and 8 mm.

This improvement of the radius of curvature is unfortunately accompanied by a significant increase in the weight of the flexible tube.

To offset this disadvantage of weight increase, it is obviously possible to replace a portion of the thickness of the compact elastomer compound wall of the conventional flexible tube with a cellularized elastomer compound layer. If we compare embodiments 1c, 2d and 3e, each having one-half of their total wall thickness consisting of cellularized elastomer compound for a total thickness of 4 mm, 6 mm and 8 mm, respectively, the effect of the wall thickness on the limit radius of curvature is quite apparent, since said limit radius of curvature R assumes the corresponding values of 98 mm, 82 mm and 70 mm.

The comparison of the three curves R1, R2 and R3 of the limit radius of curvature for a constant wall thickness of the flexible tube, shows the gain contributed by the cellularized elastomer compound layer.

In a flexible tube with a total wall thickness of 4 mm, the replacement of 3 mm of compact elastomer compound with the same thickness of cellularized elastomer compound allows the limit radius of curvature R1 to drop from 125 mm to 88 mm, i.e. a gain of 42%.

Likewise, in a flexible tube having a total wall thickness of 6 mm, the replacement of 5 mm of compact elastomer compound with the same thickness of cellularized elastomer compound allows the limit radius of curvature R2 to drop from 105 mm to 72 mm, i.e. a gain of almost 46%.

Finally, in a flexible tube having a total wall thickness of 8 mm, the replacement of 7 mm of compact elastomer compound with the same thickness of cellularized elastomer compound allows the limit radius of curvature R3 to drop from 98 mm to 58 mm, i.e. a gain of 69%.

These improvements of the limit radius of curvature do not come at the expense of an increase in the weight of the flexible tube, on account of the low density of the cellularized elastomer compound layer.

The effectiveness of the cellularized elastomer compound layer in the prevention of the kinking phenomenon is therefore demonstrated. The presence of the cellularized elastomer compound layer also contributes a significant degree of thermal isolation to the flexible tube.

Figure 7A:
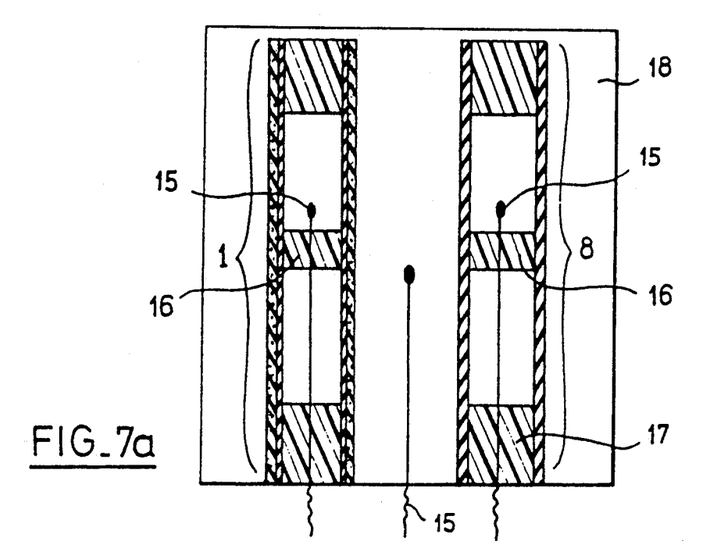
FIGS. 7a and 7b illustrate the thermal insulation contributed by the presence in the wall of a layer of cellularized elastomer compound.
Figure 7B:
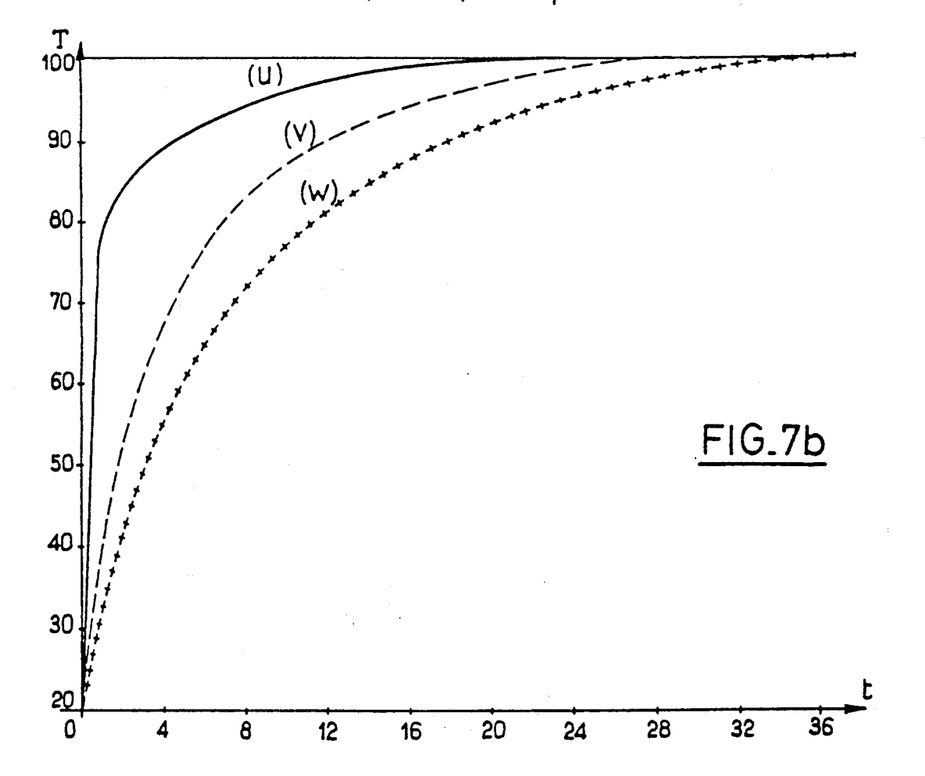
Figure 8A:
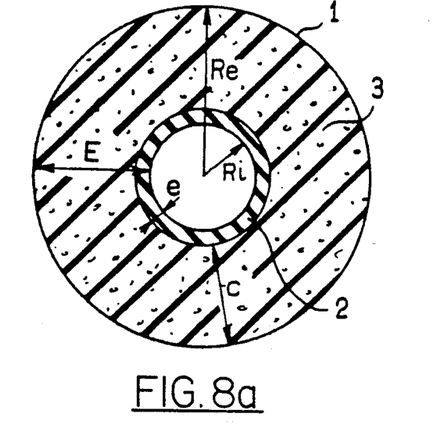
FIGS. 8a-8f illustrate several possibilities variations of the flexible tube having voids within the outer layer.
Figure 8B:
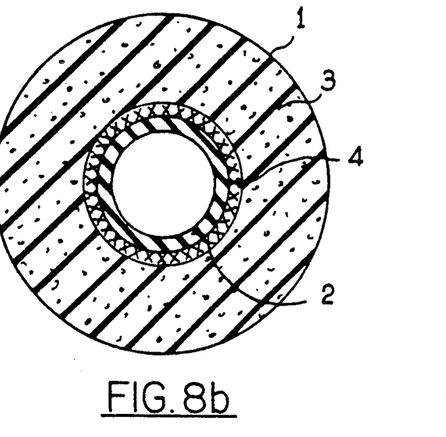
Figure 8C:
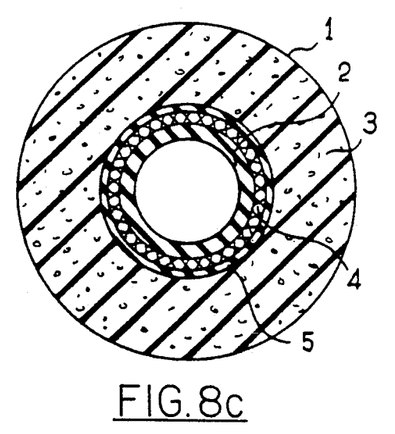
Figure 8D:
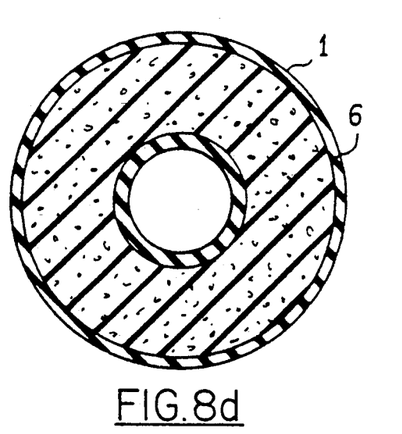
Figure 8E:
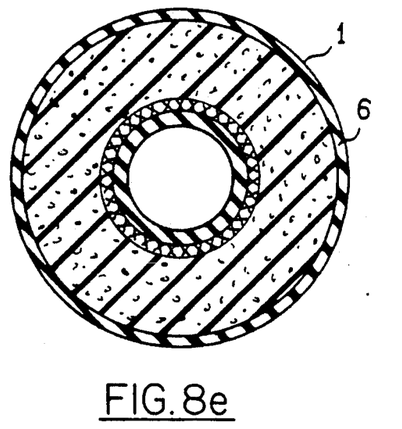
Figure 8F:
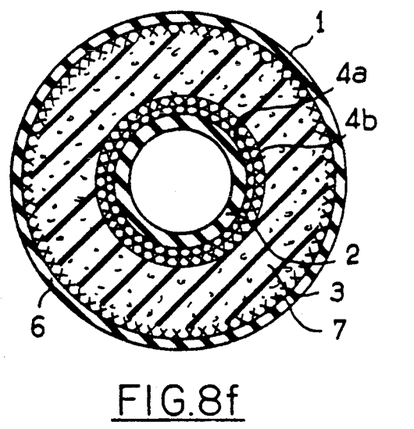

FIGS. 7a and 7b show the measurement and the results of this thermal isolation.

The experiment comprised the measurement, in accordance with the diagram in FIG. 7a, of the temperature reached inside a conventional flexible tube 8, having a compact elastomer compound wall, and a flexible tube 1 according to the invention, having a layer of cellularized elastomer compound in its wall.

Each of the flexible tubes 1 and 8 is equipped with a thermocouple 15 held inside its tube by a support 16 made of a thermally insulating material each tube is closed on its ends by plugs 17, also made of a thermally insulating material. The two flexible tubes 1 and 8 are placed in a ventilated furnace 18, whose temperature, also measured by a thermocouple 15, is gradually increased from 25° C. to 100° C.

FIG. 7b is a graph which illustrates the evolution of the temperatures as a function of time.

The abscissa axis Ot represents the time in minutes.

The ordinate axis OT represents the temperature in degrees Celsius.

Curve U is the curve of the furnace temperature as a function of time as the temperature increases.

Curve V represents the development of the temperature, as a function of time, inside the conventional flexible tube, with a wall made of homogeneous elastomer compound.

Curve W represents the development of the temperature, as a function of time, inside the flexible tube according to the invention, comprising a layer of cellularized elastomer compound in its wall.

The comparison of the curves V and W shows the thermal insulation effect of the wall comprising the layer of cellularized elastomer compound in relation to the wall made of compact elastomer compound. The results, presented in the following table, show the time taken to reach a given temperature T, respectively by the air in the furnace tu, by the air contained in the conventional flexible tube with a compact elastomer compound wall tv and by the air contained in the tube according to the invention, which includes a layer of cellularized elastomer compound in its wall tw.

The table also indicates the difference (tv−tu) between the time required for heating of the air in the conventional flexible tube and in the furnace; the difference (tw−tu) between the time required to heat the air in the flexible tube, according to the invention, and in the furnace; and the difference (tw−tv) between the time required to heat the air in conventional flexible tubes and tubes according to the invention. A thermal insulation ratio I, contributed by the flexible tube, according to the invention, compared to the conventional flexible tube, can be derived from these curves by defining the value I as being equal to (tw−tv)×100/tv.

| Temperature °C. | tu sec. | tv sec. | tv-tu sec. | tw sec. | tw-tu sec. | tw-tv sec. | I % |
|---|---|---|---|---|---|---|---|
| 50 | 30 | 108 | 78 | 192 | 162 | 84 | 77.8 |
| 60 | 42 | 180 | 138 | 300 | 258 | 120 | 66.7 |
| 70 | 54 | 270 | 216 | 450 | 396 | 180 | 66.7 |
| 80 | 72 | 432 | 360 | 696 | 624 | 264 | 61.1 |
| 90 | 276 | 720 | 444 | 1080 | 804 | 360 | 50.0 |
| 100 | 1200 | 1680 | 480 | 2280 | 1080 | 600 | 35.7 |

It is, therefore, apparent that the time taken to reach a certain temperature by the air contained in the flexible tube, according to the invention, compared to the time taken by the air contained in the conventional flexible tube, is nearly 76% greater to reach 50° C. and still almost 36% greater to reach 100° C.

The thermal insulation contributed to the flexible tube by the cellularized elastomer compound layer in the wall is, therefore, significant.

FIGS. 8a-8f show further embodiments of the connector of the present invention similar to those as shown in FIGS. 2a-2f. However, FIGS. 8a-8f depict the connector being constructed so that the layer 3 comprises the cellularizable material as described above.

Figure 9A:
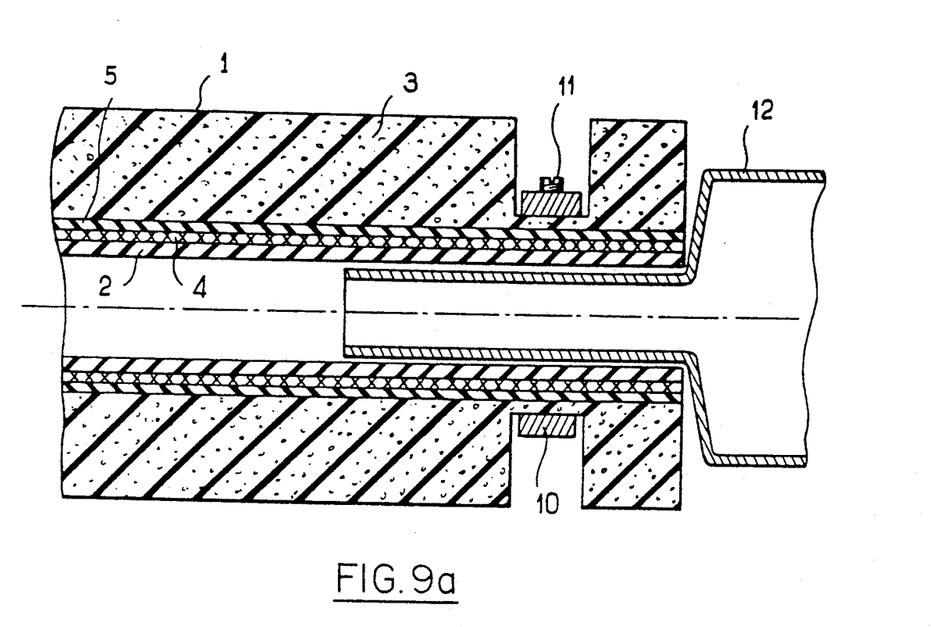
FIGS. 9a and 9b illustrate two additional variants of the connector with a clamping ring integrated into a wall having voids therein.
Figure 9B:
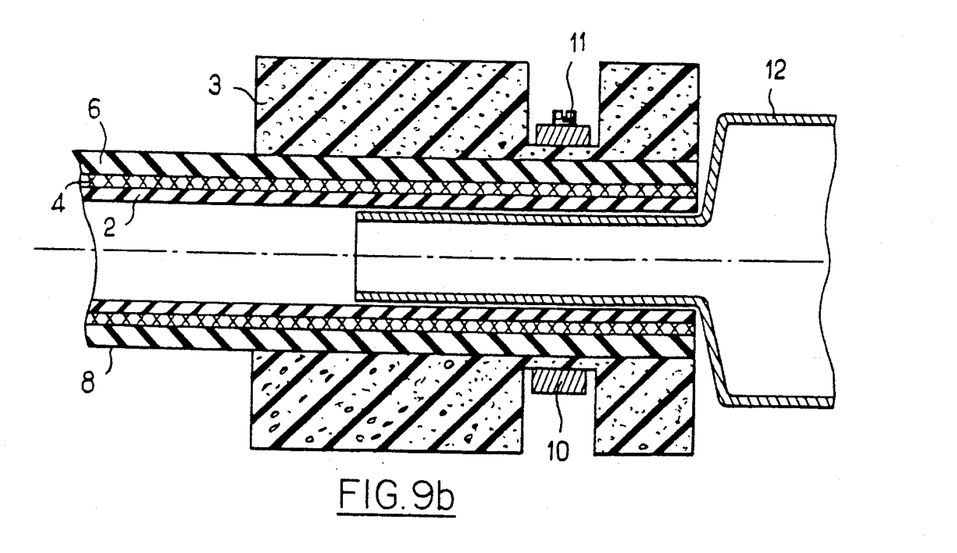

FIGS. 9a and 9b, show similar connectors as the connectors of FIGS. 1a and 1b, but constructed so that the layer 3 comprises the cellularizable material.

For the Embodiments as depicted by FIGS. 8a-8f, 9a and 9b, the compact elastomer compound of the internal tube 2 preferably will have a formulation adapted in order to permit the internal tube 2 to resist the effects of the fluids transported by the connector 1.

Therefore, for example, the basic elastomer of the compact elastomer compound, of which the internal tube 2, is preferably made, will be a terpolymer of the following three components: ethylene, propylene and the third monomer of the combination being diene monomer. This terpolymer is termed ethylene-propylene-diene monomer. Ethylene-propylene-diene monomer is used if the internal tube is to be resistant to heat or oxidizing fluids. On the other hand, ethylene-propylene-diene monomer will be omitted as the basic elastomer of the compact elastomer compound of an internal tube 2 for the transport of oils or hydrocarbons.

For reasons of hygiene, a special formulation, which can also be based on ethylene-propylene-diene monomer, will be used for the transport of potable fluids such as water, milk or wine, or fluids which come in contact with edible products.

The basic elastomer of the compact elastomer compound of the internal tube 2 will preferably be a copolymer of butadiene and acrylonitrile (this copolymer is usually termed nitrile-butadiene rubber) or of polyethylene chloride for the transport of liquid or gaseous hydrocarbons and fatty products. Polyethylene chloride is preferably a monomer including chlorine in its structure.

On the other hand, nitrile-butadiene rubber will not be used as the basic elastomer of the compact elastomer compound of the internal tube 2, if the flexible tube is intended for the transport of hot water. Polychloroprene will be preferred as the basic elastomer of the compact elastomer compound of the internal tube 2 for the transport of oils and hydrocarbons, such as nitrilebutadiene rubber, and also for the transport of a large number of corrosive chemical fluids, to which they must be resistant.

The cellularizable elastomer compound of the layer 3 will have a formulation enabling the flexible tube 1 to withstand the environment in which it will be used.

The cellularizable elastomer compound comprises a basic elastomer such as, by way of non-limiting examples, natural rubber, styrene-butadiene rubber, a terpolymer of ethylene, propylene and a diene termonomer, a copolymer of butadiene and acrylonitrile or polyethylene chloride.

The vulcanization systems and protection against aging, as well as the additives, will be adjusted to suit the conditions of utilization.

The cellularizable elastomer compound also contains a pore forming agent which, when a thermal treatment is performed, will cause the formation of cells. The pore forming agent can be selected, by way of non-limiting examples, from organic compounds such as azidocarbonamide, azidoisobutyronitrile, pp'oxy bis benzene sulfonylhydrazide or dinitrosopentamethylene tetramine. It is also possible to use a mineral inflating agent such as an ammonium carbonate.

The type and proportion of the pore-forming agent introduced into the elastomer are a function of the density and the size of the cells desired.

The cellularizable elastomer compound of layer 3 is compact, being without cells therein, at the time it is applied over all or part of the periphery of the compact elastomer compound layer constituting the internal tube 2, during the fabrication of the flexible tube 1. The cellularization occurs only when foaming is present during the thermal vulcanization treatment, which must be performed at a suitable temperature to cause the reaction of the pore forming agent.

One embodiment of the flexible tube, which is the object of the invention, is the making of very long tubing, using the extrusion techniques customarily used in the rubber transformation industry.

It comprises the extrusion of the compact elastomer compound with a formula suitable for the fluid to be transported into the internal tube and then, if necessary, the continuous deposition, e.g. by wrapping, braiding or knitting, of the reinforcement material or materials, and then placing, over all or part of the length of the tube, an elastomer compound, which is initially compact, but which contains pore-forming agents, which will allow it to cellularize under the effect of heat. If the flexible tube also comprises an external coating, the corresponding compact elastomer compound is also deposited, e.g. by extrusion, either directly over the cellularizable elastomer compound or after the interposition of a breaker, most frequently made of wires or cables, which are made of metal or textile.

The assembly is then vulcanized by traditional means, either in long lengths, or individual pieces, after cutting to the desired length and placement over a mandrel with the appropriate shape.

During vulcanization, the thermal treatment simultaneously causes the cellularization of the cellularizable elastomer layer, the reticulation of all the elastomer compounds, and bonding of the various constituent elements.

To construct a flexible tube with an integrated clamping ring over a flexible tube, comprising, over all or part of its length, a layer of cellularizable elastomer compound, it is sufficient, using appropriate mechanical means, to prevent the expansion of the cellularizable elastomer layer in the zone intended for the ring. Preferably, the clamping ring itself, which may be separated from the cellularizable layer by a band, will be used to tighten it on the mandrel, and it can therefore remain in place after vulcanization.

To achieve notches, shoulders, reference points, markings, or special shapes on the end or in different zones of the flexible tube, it is sufficient, before vulcanization, to place this portion in a mold or a shell, whose imprint has a suitable shape, to prevent or limit the expansion during foaming of the cellularizable elastomer compound.

In conclusion, the flexible tube, which is the object of the invention, offers the following advantages over the solutions of the prior art:

- it accepts small radii of curvature, without kinking, even when it does not have a textile or metal reinforcement element in the wall;
- it retains great flexibility, since it does not have any stiffeners;
- it is lightweight, since it does not have any special reinforcement elements, other than those required for the intended utilization, and also since the density of the cellularized elastomer compound is low;
- it exhibits improved strength during use at internal pressures, below ambient pressure;
- it permits the realization of a smooth internal tube made of a homogeneous elastomer compound, with a formulation appropriate to the fluid to be transported;
- it also contributes to the thermal insulation of the fluid transported. This insulation can be adapted, by appropriately formulating the cellularizable elastomer compound, to the requirements of the individual application;
- it provides protection of the internal tube against thermal or chemical corrosion from the environment;
- it protects the internal tube against accidental damage caused by tools or contact with sharp metal elements;
- it is easy to fabricate, both in tubes of great length and special shapes, without requiring tools or equipment other than those customarily used in the rubber transformation industry;
- it allows the use of elements comprising one or more integrated clamping rings, which cannot readily fall out, and whose positioning, therefore, substantially assures the absence of leaks, once installed, or elements which allow an easy marking of the part, or even marks to distinguish one end of the flexible tube from the other, thereby preventing errors in installation on the connection terminals. In addition, shoulders or special shapes can be placed on any part of the flexible tube.

The flexible tube, which is the object of the invention, is used in all industrial sectors requiring the transfer of a fluid, liquid, gas or even powder, or in various fluid circuits or air conditioning systems of an automotive vehicle, whenever the installation requires the tube to assume low radii of curvature without kinking.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A method of making a connector for connecting at least a first pipe segment to a second pipe segment, the connector comprising at least a first tubular element and a second tubular element, said second tubular element being disposed about at least a portion of said first tubular element, said second tubular element having at least a first portion, a second portion, and a third portion disposed side by side along said connector, said third portion being disposed adjacent and between said first portion and said second portion, said first portion having a first diameter, said second portion having a second diameter, and said third portion having a third diameter such that the first diameter and the second diameter are greater than the third diameter, said third portion comprising a housing within said second tubular element, and said housing comprising clamp means disposed within said housing for retaining said connector on at least one of: the first pipe segment and the second pipe segment, said method comprising the steps of:

disposing said second tubular element over at least a portion of the first tubular element;

disposing at least one clamp means about said second tubular element upon said third portion of said second tubular element so that said second tubular element is disposed within said at least one clamp means; and treating said second tubular element to expand said second tubular element in said first and said second portions of said second tubular element in a direction away from said first tubular element to thereby form said housing in said second tubular element.

2. The method according to claim 1, wherein said treating said second tubular element to expand said second tubular element comprises forming voids in said second tubular element.

3. The method according to claim 2, wherein said treating of said second tubular element comprises forming voids having a first size in each said first and said second portion of said second tubular element and forming voids having a second size in said third portion of said second tubular element, and said second size of said voids in each said third portion of said second tubular element is smaller than said first size of said voids in said first and said second portions of said second tubular element.

4. The method according to claim 3, wherein:
said connector comprises a first end and a second end and each of said first end and said second end comprises at least said first portion, said second portion, and said third portion; and
said method further comprises:
disposing at least one clamp means about each end of said second tubular element before said treating of said second tubular element; and
treating said second tubular element to expand said second tubular element in each said first and said second portion of said second tubular element to thereby form at least one said housing in each of said first end and said second end of said second tubular element.

5. The method according to claim 4, wherein:
said first tubular element has a first thickness and said expanded second tubular element in said first and said second portions has a second thickness; and
said treating said second tubular element to expand said second tubular element comprises expanding said second tubular element in said first and said second portions of said second tubular element to provide a ratio of said first thickness to said second thickness of between 0.08 to 0.95.

6. The method according to claim 5, wherein said method additionally comprises:
disposing first reinforcement means about said first tubular element before disposing said second tubular element over said first tubular element, said first reinforcement means comprising one selected from the group consisting of: fabric, wires, textile cables and metal cables, said first reinforcement means having a first modulus of elasticity;
disposing second reinforcement means about said second tubular element before said treating, said second reinforcement means comprising one selected from the group consisting of: wires, textile cables and metal cables; and
disposing at least one additional tubular element about said first reinforcement means before disposing said second tubular element over said first tubular element; and
disposing at least one cover layer about said second tubular element.

7. The method according to claim 6, wherein:
said first tubular member comprises a first elastomeric compound;
said second tubular member comprises a second elastomeric compound, said second tubular member having a second modulus of elasticity;
said at least one additional tubular element comprises a third elastomeric compound, said at least one additional tubular element having a third modulus of elasticity;
said first modulus of elasticity being greater than said third modulus of elasticity and said third modulus of elasticity being greater than said second modulus of elasticity; and
said method further comprises:
heating said connector to vulcanize each said tubular member and integrally bond the elastomeric compounds of the tubular members to one another to form a connector having a modulus of elasticity gradient to distribute stresses and minimize kinking of the connector during bending of the connector.

8. The method according to claim 7, further including:
extruding the first tubular member;
depositing the first reinforcement means onto the first tubular member by at least one selected from the group consisting of:
wrapping, braiding and knitting the reinforcement means
around the first tubular member;
extruding said second tubular member over said at least a portion of said first tubular member;
depositing the second reinforcement means onto the second tubular member;
extruding the cover layer over the second reinforcement means;
cutting the connector to form pieces having desired lengths; and
treating the connector pieces to expand the second tubular layer in said first and second portions.

* * * * *

UNITED STATES PATENT AND TRADEMARK OFFICE
CERTIFICATE OF CORRECTION

PATENT NO. : 5,259,112
DATED : November 9, 1993
INVENTOR(S) : Pierre MATTE, Maurice DESCHEMAEKER, Robert COLLEY It is certified that error appears in the above-indentified patent and that said Letters Patent is hereby corrected as shown below:

ON THE TITLE PAGE:

Insert --Related U.S. Application Data

[63]   Continuation of Ser. No. 07/186,057, April 25, 1988, abandoned.

Foreign Application Priority Data

[30]   April 30, 1987 [FR] France.......8706224--.

Further, in Column 1, line 3, after the title insert:

--CONTINUING APPLICATION DATA

This application claims continuation status from U.S. Serial No. 07/186,057, filed on April 25, 1988, now abandoned, which claims priority from French Application No. 8706224, filed on April 30, 1987.--

Signed and Sealed this

Twentieth Day of September, 1994

Attest:

BRUCE LEHMAN

Attesting Officer           Commissioner of Patents and Trademarks